(12) United States Patent
D'Agosto et al.

(10) Patent No.: US 11,338,559 B2
(45) Date of Patent: May 24, 2022

(54) POLYOLEFIN BASED FILMS WITH MATTE SURFACE AND IMPROVED SEALING PERFORMANCE

(71) Applicants: Dow Global Technologies LLC, Midland, MI (US); PBBPolisur S.R.L., Buenos Aires (AR)

(72) Inventors: Silvina Vanesa D'Agosto, Buenos Aires (AR); Nicolas Cardoso Mazzola, Jundiai (BR); Jorge Caminero Gomes, Jundiai (BR); Gianna Buaszczyk, Jundiai (BR)

(73) Assignees: Dow Global Technologies LLC, Midland, MI (US); PBBPolisur S.R.L., Buenos Aires (AR)

( * ) Notice: Subject to any disclaimer, the term of this patent is extended or adjusted under 35 U.S.C. 154(b) by 201 days.

(21) Appl. No.: 16/762,301

(22) PCT Filed: Nov. 20, 2018

(86) PCT No.: PCT/US2018/061977
§ 371 (c)(1),
(2) Date: May 7, 2020

(87) PCT Pub. No.: WO2019/104017
PCT Pub. Date: May 31, 2019

(65) Prior Publication Data
US 2021/0170726 A1  Jun. 10, 2021

Related U.S. Application Data

(60) Provisional application No. 62/589,910, filed on Nov. 22, 2017.

(51) Int. Cl.
*B32B 27/08* (2006.01)
*B32B 7/02* (2019.01)
(Continued)

(52) U.S. Cl.
CPC .......... *B32B 27/08* (2013.01); *B32B 7/02* (2013.01); *B32B 27/32* (2013.01); *B65D 65/40* (2013.01);
(Continued)

(58) Field of Classification Search
CPC .......... B32B 27/08; B32B 7/02; B32B 27/32; B32B 2250/03; B32B 2250/242;
(Continued)

(56) References Cited

U.S. PATENT DOCUMENTS 3,645,992 A   2/1972   Elston
3,914,342 A   10/1975  Mitchell
(Continued)

FOREIGN PATENT DOCUMENTS

CN   103003350 A   3/2013
EP      367613 A2   5/1990
(Continued)

OTHER PUBLICATIONS

International Search Report and Written Opinion pertaining to PCT/US2018/061977, dated Feb. 28, 2019.
(Continued)

*Primary Examiner* — James C Yager
(74) *Attorney, Agent, or Firm* — Dinsmore & Shohl LLP

(57) ABSTRACT

Embodiments of the present disclosure are directed to multilayer films, which provide matte appearance and low heat seal initiation temperature after corona treatment. The multilayer films include at least one matte layer comprising ethylene-based polymer and propylene-ethylene copolymer.

14 Claims, 2 Drawing Sheets

(51) Int. Cl.
    *B32B 27/32*     (2006.01)
    *B65D 65/40*     (2006.01)

(52) U.S. Cl.
    CPC ..... *B32B 2250/03* (2013.01); *B32B 2250/242* (2013.01); *B32B 2270/00* (2013.01); *B32B 2307/31* (2013.01); *B32B 2307/406* (2013.01); *B32B 2307/408* (2013.01); *B32B 2307/72* (2013.01); *B32B 2439/46* (2013.01); *Y10T 428/1379* (2015.01)

(58) Field of Classification Search
    CPC ........... B32B 2270/00; B32B 2307/31; B32B 2307/406; B32B 2307/408; B32B 2307/72; B32B 2439/46; B32B 2439/40; B32B 27/30; B32B 27/306; B32B 27/34; B65D 65/40; Y10T 428/1379
    See application file for complete search history.

(56) References Cited

U.S. PATENT DOCUMENTS

| | | |
|---|---|---|
| 4,076,698 A | 2/1978 | Anderson et al. |
| 4,599,392 A | 7/1986 | McKinney et al. |
| 5,272,236 A | 12/1993 | Lai et al. |
| 5,278,272 A | 1/1994 | Lai et al. |
| 5,582,923 A | 12/1996 | Kale et al. |
| 5,733,155 A | 3/1998 | Sagawa |
| 5,854,045 A | 12/1998 | Fang et al. |
| 6,534,153 B1 | 3/2003 | Chu et al. |
| 2012/0258307 A1 | 10/2012 | Cretekos et al. |

FOREIGN PATENT DOCUMENTS

| | | |
|---|---|---|
| EP | 1396336 A1 | 3/2004 |
| WO | 2010008696 A1 | 1/2010 |
| WO | 2012015807 A1 | 2/2012 |
| WO | 2017003543 A1 | 1/2017 |

OTHER PUBLICATIONS

Williams and Ward, J. Polym. Sci., Polym. Letters, 6, 621 (1968).

Chinese Office Action pertaining to CN 201880071112.2, dated Feb. 7, 2022.

Chinese Search Report pertaining to CN 20188001112.2, dated Feb. 7, 2022.

POLYOLEFIN BASED FILMS WITH MATTE SURFACE AND IMPROVED SEALING PERFORMANCE

CROSS-REFERENCE TO RELATED APPLICATIONS

This application is a National Stage Entry under 35 U.S.C. § 371 of International Patent Application No. PCT/US2018/061977, filed Nov. 20, 2018, which claims the benefit of U.S. Provisional Patent Application Ser. No. 62/589,910 filed Nov. 22, 2017, both of which are hereby incorporated by reference in their entireties.

TECHNICAL FIELD

Embodiments of the present disclosure relate to polyolefin based films with a matte surface and improved heat sealing performance, specifically improved heat sealing performance after corona treatment.

BACKGROUND

Polymer films having a matte surface are commonly used in a variety of applications. For example, packaging applications utilize polymer films having a matte surface. Optical properties, such as matte surface, may be defined in terms of surface gloss and haze. A matte surface may be characterized by lower gloss and higher haze values.

In a specific example, diapers are generally unitized in gusset bags composed of flexible polyethylene films. These gusseted flexible containers are currently produced using flexible films which are folded to form gussets and heat sealed in a perimeter shape. The gusseted body section opens to form a flexible container with a square cross section or a rectangular cross section. The gussets are terminated at the bottom of the container to form a substantially flat base, providing stability when the container is partially or wholly filled. The gussets are also terminated at the top of the container to form an open neck for receiving a rigid fitment and closure. This film is extruded, superficially treated, printed on the outside layer, and forms a bag through cutting and sealing. It is desirable that such gusset bags have a matte surface; however, conventional matte films lack sealing performance after corona treatment, specifically, in the gusset area, because the heat seal initiation temperature is too high.

Accordingly, there may be a continual need for improved matte surfaces which are also heat sealable after corona treatment.

SUMMARY

Embodiments of the present disclosure are directed to multilayer films, which may provide matte appearance and low heat seal initiation temperature after corona treatment. The multilayer films comprise ethylene-based polymer and propylene-ethylene copolymer in at least one layer of the multilayer film as described further herein.

According to one embodiment, a multilayer film comprising at least one matte layer and at least two additional layers is provided. The matte layer comprises: 20 to 80 weight % propylene-ethylene copolymer having a density from 0.857 to 0.895 g/cc and a melt flow rate ($I_2$) of 2 to 25 g/10 min when measured according to ASTM D-1238 at 230° C. and 2.16 kg; and 20 to 80 weight % ethylene-based polymer having a density from 0.935 to 0.955 g/cc and a melt flow rate (Is) of 0.1 to 1.0 g/10 min when measured according to ASTM D-1238 at 190° C. and 5.0 kg. The multilayer film comprises the at least two additional layers which independently may comprise at least one of polyamide, propylene-based polymer, ethylene-based polymer, ethylene vinyl acetate (EVA), ethylene vinyl alcohol (EVOH), ethylene acrylic acid, and ethylene maleic anhydride. The multilayer film has a gloss 45% value of less than 10 units when measured according to ASTM D-2457. The multilayer film has a hot tack initiation temperature of 70° C. or below.

According to another embodiment, the multilayer film may have a gloss 45% value of less than 10 units when measured according to ASTM D-2457, and a heat seal strength of at least 4 N/25.4 mm at 100° C.

Additional features and advantages of the embodiments described herein will be set forth in the detailed description which follows, and in part will be readily apparent to those skilled in the art from that description or recognized by practicing the embodiments described herein, including the detailed description which follows, and the claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
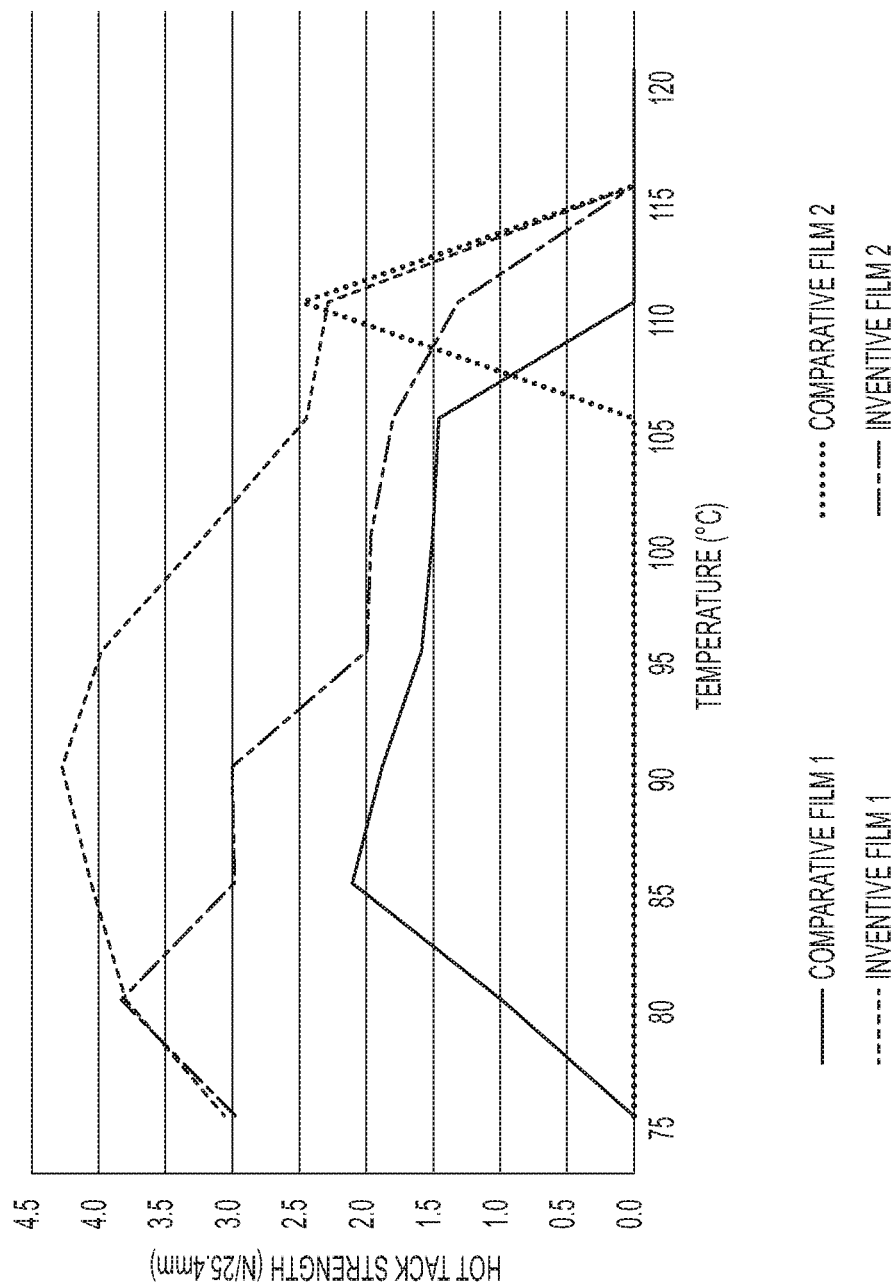
FIG. 1 is a graphical depiction of hot tack strength vs temperature for comparative and inventive films according to one or more embodiments of the present disclosure.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Definitions

The term "polymer" refers to a polymeric compound prepared by polymerizing monomers, whether of the same or a different type. The generic term polymer thus embraces the term "homopolymer" usually employed to refer to polymers prepared from only one type of monomer as well as "copolymer" which refers to polymers prepared from two or more different monomers. The term "block copolymer" refers to a polymer comprising two or more chemically distinct regions or segments (referred to as "blocks"). In some embodiments, these blocks may be joined in a linear manner, that is, a polymer comprising chemically differentiated units which are joined end-to-end. A "random copolymer" as used herein comprises two or more polymers where each polymer may comprise a single unit or a plurality of successive repeat units along the copolymer chain back bone. Even though some of the units along the copolymer chain backbone exist as single units, these are referred to as polymers herein.

"Multilayer film" or "multilayer film structure" means any structure having more than one layer. For example, the multilayer structure may have two, three, four, five or more layers. A multilayer structure may be described as having the layers designated with letters. For example, a three layer structure having a core layer B, and two external layers A and C may be designated as A/B/C. Likewise, a structure having two core layers B and C and two external layers A and D would be designated A/B/C/D. In some embodiments, a multilayer film of the present invention comprises up to 11 layers.

"Polyethylene" or "ethylene-based polymer" shall mean polymers comprising greater than 50% by mole of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). As used herein, "ethylene/α-olefin random copolymer" is a random copolymer comprising greater than 50% by mole of units derived from ethylene monomer The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference).

The term "LLDPE", includes resin made using Ziegler-Natta catalyst systems as well as resin made using single-site catalysts, including, but not limited to, bis-metallocene catalysts (sometimes referred to as "m-LLDPE") and constrained geometry catalysts, and resin made using post-metallocene, molecular catalysts. LLDPE includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPE resins can be made via gas-phase, solution-phase or slurry polymerization or any combination thereof, using any type of reactor or reactor configuration known in the art.

The term "MDPE" refers to medium density polyethylenes having densities from 0.926 to 0.940 g/cc. "MDPE" is typically made using chromium or Ziegler-Natta catalysts or using single-site catalysts including, but not limited to, bis-metallocene catalysts and constrained geometry catalysts.

The term "HDPE" refers to polyethylenes having densities greater than about 0.940 g/cc, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cc, which are generally prepared with Ziegler-Natta catalysts, single-site catalysts including, but not limited to, bis-metallocene catalysts and constrained geometry catalysts, and post-metallocene, molecular catalysts.

The term "propylene-based polymer," as used herein, refers to a polymer that comprises, in polymerized form, refers to polymers comprising greater than 50% by mole of units which have been derived from propylene monomer. This includes propylene homopolymer, random copolymer polypropylene, impact copolymer polypropylene, propylene/α-olefin copolymer, and propylene/α-olefin copolymer.

The term "corona treatment" is a technique which increases the adhesion strength on the surface of a polyolefin film by corona discharge.

"Hot tack strength" and like terms mean the strength of heat seals formed between thermoplastic surfaces of flexible webs, immediately after a seal has been made and before it cools to ambient temperature. In form-fill operations, sealed areas of packages are frequently subject to disruptive forces while still hot. If the hot seals have inadequate resistance to these forces, breakage can occur during the packaging process. Hot tack strength, also known as hot seal strength, is a measure to characterize and rank materials in their ability to perform in commercial applications where this quality is critical. Hot tack strength can be measured in accordance with ASTM F1921 as described below.

"Hot Tack Initiation Temperature (HTIT)" is the temperature that seal holds the required weight to be filled, whereas "Heat Seal Initiation Temperature (HSIT)" is the temperature that the seal has a minimum strength to withstand transportation and handling requirements.

Reference will now be made in detail to multilayer film embodiments of the present disclosure, where the compositions include at least one matte layer and at least two additional layers. As used herein, "matte layer", which may in some cases be called a sealant layer, is a layer which achieves the desired matte appearance while also being heat sealable after corona treatment. From a property standpoint, the multilayer film, which includes this matte layer, has a gloss 45% value of less than 10 units when measured according to ASTM D-2457. In combination with this gloss, the multilayer film may include a hot tack initiation temperature of 70° C. or below, a heat seal strength of at least 4 N/25.4 mm at 100° C., or both. Without being bound by theory, the combination of propylene-ethylene copolymer and ethylene-based polymer in the matte layer helps enable the matte appearance while also being heat sealable after corona treatment.

In one or more embodiments, the matte layer comprises propylene-ethylene copolymer having a density from 0.857 to 0.895 g/cc and a melt flow rate ($I_2$) of 2 to 25 g/10 min when measured according to ASTM D-1238 at 230° C. and 2.16 kg, and ethylene-based polymer having a density from 0.935 to 0.955 and a melt flow rate (Is) of 0.1 to 1.0 g/10 min when measured according to ASTM D-1238 at 190° C. and 5.0 kg. In further embodiments, the matte layer comprises 20 to 80 weight % propylene-ethylene copolymer and 20 to 80 weight % ethylene-based polymer. In addition to the at least one matte layer, at least two additional layers may independently comprise at least one of polyamide, propylene-based polymer, ethylene-based polymer, ethylene vinyl acetate (EVA), and ethylene vinyl alcohol (EVOH) polyamide, propylene-based polymer, ethylene-based polymer, ethylene vinyl acetate (EVA), ethylene vinyl alcohol (EVOH), ethylene acrylic acid (EAA), and ethylene maleic anhydride (EMA).

In further embodiments, the melt flow rate ($I_2$) of the propylene-ethylene copolymer is from 2 to 10 g/10 min when measured according to ASTM D-1238 at 230° C. and 2.16 kg, or from 3 to 9 g/10 min, or from 6 to 9 g/10 min. Moreover, in another embodiment, the density of the propylene-ethylene copolymer is from 0.870 to 0.890 g/cc. Various compositions are contemplated as suitable for the propylene-ethylene copolymer. Suitable commercial embodiments for the propylene-ethylene copolymer include the VERSIFY™ products from The Dow Chemical Company, Midland, Mich., for example, VERSIFY™ 3200.

In further embodiments of the ethylene-based polymer, the melt flow rate ($I_5$) may be from 0.1 to 0.8 g/10 min, or from 0.2 to 0.4 g/10 min when measured according to ASTM D-1238 at 230° C. and 5 kg. Moreover, in further embodiments, the density of the ethylene-based polymer may be from 0.935 to 0.950 g/cc, or from 0.935 to 0.945 g/cc.

Various compositions are contemplated as suitable for the ethylene-based polymer. Suitable commercial embodiments for the ethylene-based polymer may include DOW™ MDPE NG6995, DOW™ HDPE NG 7000, or DOW™ HDPE DGDC 2100-NT7, which are all available from The Dow Chemical Company, Midland, Mich. Additionally, another suitable commercial embodiment of ethylene-based polymer may be Braskem BF4810 produced by Braskem.

Various blend amounts are contemplated for the propylene-ethylene copolymer and ethylene-based polymer within the matte layer. In one or more embodiments, the matte layer may comprise 20 to 80 wt % propylene-ethylene copolymer, or from 30 to 70 wt % propylene-ethylene copolymer, or from 40 to 60 wt % propylene-ethylene copolymer, or 50 wt % propylene-ethylene copolymer. Conversely, the matte layer may comprise 20 to 80 wt % ethylene-based polymer, or from 30 to 70 wt % ethylene-based polymer, or from 40 to 60 wt % ethylene-based polymer, or 50 wt % ethylene-based polymer.

As noted above, one or more of the additional layers of the multilayer film may independently comprise at least one of polyamide, propylene-based polymer, ethylene-based polymer, EVA, EVOH, EVA, and EMA. The propylene-based polymer and ethylene-based polymer may include the composition embodiments described above.

In another embodiment, at least one of the two additional layers comprises linear low density polyethylene (LLDPE) having a density of 0.905 to 0.930 g/cc and a melt flow rate ($I_2$) from 0.5 to 3.0 g/10 min when measured according to ASTM D-1238 at 190° C. and 2.16 kg. In a further embodiment, the LLDPE may comprise a density of 0.915 to 0.925 g/cc. In even further embodiments, the melt flow rate ($I_2$) of the LLDPE is from 0.5 to 2.0 g/10 min, or from 0.5 to 1.5-g/10 min.

Various commercial compositions are contemplated for the LLDPE. For example, the LLDPE may include one or more of ELITE™ NG 5401B, DOWLEX™ NG 2045B, and DOWLEX™ TG 2085B, all of which are available from The Dow Chemical Company, Midland Mich.

Moreover, at least one of the two additional layers may comprise low density polyethylene (LDPE) having a density of 0.910 to 0.935, a melt flow rate ($I_2$) of 0.5 to 3.0 g/10 min when measured according to ASTM D-1238 at 190° C. and 2.16 kg, and a molecular weight distribution (MWD=Mw/Mn) of 3 to 10 determined via gel permeation chromatography (GPC), where Mw is the weight averaged molecular weight, and Mn is the number averaged molecular weight.

Furthermore, at least one of the additional layers may comprise a blend of LLDPE and LDPE. In further embodiments, at least two additional layers comprise a blend of LLDPE and LDPE. Various amounts are contemplated for each component in the blend of LLDPE and LDPE. For example, at least one of the two additional layers may comprise 50 to 95 wt % LLDPE, or from 60 to 90 wt % LLDPE, or from or from 60 to 80 wt % LLDPE. Conversely, at least one of the one of the two additional layers may comprise 5 to 50 wt % LDPE, or from 10 to 40 wt % LDPE, or from or from 20 to 40 wt % LLDPE.

Various additional additives are contemplated to be included in the multilayer films. These may include, but are not limited to, slip additives (for example, erucamide, oleamides, estearamides, and silicones), opacifiers or antiblock additives (for example, silica, talc, and calcium carbonate), color pigments, antistatic additives, nucleation additives, UV absorber additives, or printing inks.

Various methodologies for producing the multilayer films are contemplated. In specific embodiments, the multilayer films are produced via co-extrusion, for example, blown film extrusion or cast film extrusion. Other film treatment processes such as metallization and post orientation may also be utilized. Moreover, the present multilayer films may also be laminated or bonded to other substrates in the flexible packaging process. In specific flexible packaging embodiments, the matte layer may undergo corona treatment to increase surface tension prior to heat sealing.

The multilayer films may have various thicknesses. For example, the multilayer films may have a thickness of 20 to 200 μm, or from 20 to 150 μm. Various layer ratios in the multilayer film are contemplated. In one or more embodiments of the (A/B/C) 3 layer structure, the percentage of the overall thickness for the individual layers may range from 5/90/5 to 33/34/33, or from 25/50/25 to 30/40/30.

As stated above, the combination of matte properties and low heat seal initiation is one of the benefits of the present multilayer film embodiments. The matte surface properties of the multilayer films may be characterized by the properties of gloss. As stated above, the films may exhibit an external gloss for external matte surfaces of the film of less than 10 units when measured at 450 according to ASTM D2457. In further embodiments, the films may exhibit an external gloss of less than 8 units, or less than 6 units.

Additionally, the heat seal properties of the multilayer films may be characterized by the properties of hot tack initiation temperature (HTIT), heat seal initiation temperature (HSIT), hot tack strength, and heat seal strength. In one embodiment, the multilayer films demonstrate an HTIT of 70° C. or below. In another embodiment, the multilayer films have a hot tack strength of greater than 2.5 N/25.4 mm at a temperature range of 75° to 90° C., when measured according to ASTM F-1921. Moreover, the multilayer films have a maximum hot tack strength of at least 3 N/25.4 mm, when measured according to ASTM F-1921, or at least 3.5 N/25.4 mm. In another embodiment, the multilayer film may have a heat seal strength of at least 4 N/25.4 mm at 100° C. In yet another embodiment, the multilayer film may have a heat seal strength of at least 6 N/25.4 mm at 100° C. Moreover, the multilayer film may have a heat seal strength of 4 to 10 N/25.4 mm at 100° C., or a heat seal strength of 6 to 10 N/25.4 mm at 100° C.

Test Methods

The test methods utilized in the application generally and the Examples specifically below include the following:

Melt Flow Rate ($I_2$, $I_5$, and $I_{10}$)

Melt index ($I_2$) was measured in accordance to ASTM D-1238 at 190° C. at 2.16 kg for ethylene-based polymer resins, and at 230° C. at 2.16 kg for propylene-based polymer resins. Melt index ($I_5$) for ethylene based polymers was measured in accordance to ASTM D-1238 at 190° C. at 5 kg, and Melt index ($I_{10}$) was measured in accordance to ASTM D-1238 at 190° C. at 10 kg. The values are reported in g/10 min, which corresponds to grams eluted per 10 minutes.

Density

Samples for density measurement were prepared according to ASTM D4703 and reported in grams/cubic centimeter (g/cc or g/cm³). Measurements were made within one hour of sample pressing using ASTM D792, Method B.

Heat Seal Initiation Temperature

The heat seal initiation temperature is the minimum sealing temperature required to form a seal of specific heat strength. The seal was performed in a Brugger HSG-C sealer with 0.5 seconds dwell time at 210 N seal bar pressure. The sealed specimen was tested in an Instron Tensiometer at 10 in/min (4.2 mm/sec or 250 mm/min).

Gel Permeation Chromatography (GPC)

A GPC-IR high temperature chromatographic system from PolymerChar (Valencia, Spain), was equipped with a Precision Detectors (Amherst, Mass.), 2-angle laser light scattering detector Model 2040, an IR5 infra-red detector and a 4-capillary viscometer, both from PolymerChar. Data collection was performed using PolymerChar Instrument Control software and data collection interface. The system was equipped with an on-line, solvent degas device and pumping system from Agilent Technologies (Santa Clara, Calif.).

Injection temperature was controlled at 150° C. The columns used, were three, 10-micron "Mixed-B" columns from Polymer Laboratories (Shropshire, UK). The solvent used was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160° C. for three hours. The injection volume was "200 microliters," and the flow rate was "1 milliliters/minute." The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci.*, Polym. Letters, 6, 621 (1968)):

$$M_{polyethylene} = A \times (M_{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

$$Mn(gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} (IR_{measurement\ channel_i} / M_{PE_i})} \quad \text{(Eqn. 2)}$$

$$Mw(gpc) = \frac{\sum_{i=RV_{integration\ start}}^{i=RV_{integration\ end}} (M_{PE_i} IR_{measurement\ channel_i})}{\sum_{i=RV_{integration\ start}}^{i=RV_{integration\ end}} (IR_{measurement\ channel_i})} \quad \text{(Eqn. 3)}$$

$$Mz(gpc) = \frac{\sum_{i=RV_{integration\ start}}^{i=RV_{integration\ end}} (M_{PE_i}^2 IR_{measurement\ channel_i})}{\sum_{i=RV_{integration\ start}}^{i=RV_{integration\ end}} (M_{PE_i} IR_{measurement\ channel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and $M_{PE}$ is the polyethylene-equivalent MW determined from Equation 1. Data calculations were performed using "GPC One software (version 2.013H)" from PolymerChar.

Heat Seal Test

Heat seal measurements on the film are performed on a commercial tensile testing machine according to ASTM F-88 (Technique A). The heat seal test is a gauge of the strength of seals (seal strength) in flexible barrier materials. It does this by measuring the force required to separate a test strip of material containing the seal and identifies the mode of specimen failure. Seal strength is relevant to the opening force and package integrity. Prior to cutting, the films are conditioned for a minimum of 40 hours at 23° C. (+2° C.) and 50% (+5%) R.H. (relative humidity) per ASTM D-618 (procedure A). Sheets are then cut from the three-layer coextruded laminated film in the machine direction to a length of approximately 11 inches and a width of approximately 8.5 inches. The sheets are heat sealed across the machine direction on a Brugger HSG-C sealer over a range of temperatures under the following conditions: Sealing Pressure: 0.275 N/mm²; and Sealing Dwell Time: 0.5 s The temperature range is approximately given by the hot tack range (i.e., the temperature range over which at least a minimum hot tack seal is achieved and prior to the burn-through temperature). The sealed sheets are conditioned for a minimum of 3 hours at 23° C. (+2° C.) and 50% R.H (+5%) prior to cutting into one inch wide strips. These strips are then further conditioned for a minimum of 40 hours at 23° C. (+2° C.) and 50% R.H (+5%) prior to testing.

For testing, the strips are loaded into the grips of a tensile testing machine at an initial separation of 2 inches and pulled at a grip separation rate of 10 inches/min at 23° C. (+2° C.) and 50% R.H (+5%). The strips are tested unsupported. Five replicate tests are performed for each sealing temperature.

Hot Tack Test

Hot tack measurements on the films are performed using an Enepay commercial testing machine according to ASTM F-1921. Prior to testing, the films are conditioned for a minimum of 40 hours at 23° C. and 50% R.H. per ASTM D-618 (Procedure A). The hot tack test simulates the filling of material into a pouch or bag before the seal has had a chance to cool completely.

Sheets of dimensions 8.5" by 14" are cut from the three-layer coextruded laminated films, with the longest dimension in the machine direction. 1" by 14" strips are cut from each film. Tests are performed on these samples over a range of temperatures and the results are reported as the maximum load as a function of temperature. Typical temperature steps are 5° C. or 10° C. with 6 replicates performed at each temperature. The parameters used in the test are as follows: Specimen Width: 25.4 mm (1.0 in); Sealing Pressure: 0.275 N/mm$^2$; Sealing Dwell Time: 0.5 s; Delay time: 0.1 s; and Peel speed: 200 mm/s. The Enepay machines make 5 mm seals. The data are reported as average hot tack where average hot tack force (N) is reported as a function of temperature. The hot tack initiation temperature is the temperature required to achieve a predefined minimum hot tack force. This force is typically in the 1-2N range, but will vary depending on the specific application. The ultimate hot tack strength is the peak in the hot tack curve. The hot tack range is the range in temperature at which the seal strength exceeds the minimum hot tack force.

Gloss

Gloss was measured in accordance with ASTM D2457 using a BYK Gardner Glossmeter Microgloss 45°.

EXAMPLES

The following examples illustrate exemplary embodiments of the present monolayer and multilayer films in comparison to various comparative monolayer and multilayer films.

Example 1

The resins used in the Examples of Tables 2 and 4 are listed in Table 1 below:

Utilizing the polymer resins listed in Table 1, multilayer film structures were produced and are listed in Table 2 as follows. In Layer B, the multilayer film structures also included White Masterbatch (MB) pigment. The multilayer films had a thickness of 40 μm and the layer distributions listed in Table 2. These multilayer film structures were fabricated in a Collin blown film line in Jundai, Brazil having multiple extruders therein. The individual resin layers were blended in separate extruders in the amounts listed in Table 2 below at the listed thicknesses at an air temperature of 15° C. To produce the three layers of the three-layer multilayer film structures below, three separate extruders having the following respective die diameters were utilized: 25 mm; 30 mm; and 25 mm. Then, the coextruder die combines the layers into the structures as listed below. The coextruder was equipped with an annular die with a diameter of 60 mm and a die gap of 1.8 mm, and also included a mesh filter pack of 40/70 mesh upstream of the die. Moreover, the fabrication process utilized a Blow Up Ratio (BUR) of 2.5:1.

After formation of the multilayer films of Table 2, the films are corona treated on Layer A, i.e., the matte layer, to achieve 44 dynes surface adhesion strength.

TABLE 1

Resins used for film structures

| Commercial Name | Type | I2 @ 190° C. 2.16 kg (g/10 min) | I5 @ 190° C. 5 kg | I2 @ 230° C. 2.16 kg (g/10 min) | I2 @ 190° C. 2.16 kg (g/10 min) | % Ethylene |
|---|---|---|---|---|---|---|
| MDPE NG 6995 | MDPE | | 0.38 | | 0.939 | |
| DOWLEX ™ TG 2085B | LLDPE | 0.95 | | | 0.919 | |
| DOWLEX ™ NG 2045B | LLDPE | 1.0 | | | 0.920 | |
| DOW ™ LDPE 611A | LDPE | 0.88 | | | 0.9239 | |
| DOW ™ LDPE 203M | LDPE | 0.3 | | | 0.921 | |
| ELITE ™ NG 5401B | LLDPE | 1 | | | 0.918 | |
| ELITE ™ 5960G | HDPE | 0.85 | | | 0.962 | |
| DOW ™ HDPE NG7000 | HDPE | | 0.40 | | 0.949 | |
| DOWLEX ™ NG 2038B | LLDPE | 1.0 | | | 0.935 | |
| DOWLEX ™ NG 2049B | LLDPE | 1.0 | | | 0.926 | |
| AGILITY ™ 6047 | MDPE | 6.0 | | | 0.947 | |
| VERSIFY ™ 3200 | Propylene-ethylene copolymer | | | 8 | 0.876 | 9 |
| VERSIFY ™ 2300 | Propylene-ethylene copolymer | | | 2.0 | 0.867 | 12 |
| VERSIFY ™ 4301 | Propylene-ethylene copolymer | | | 25 | 0.867 | 12 |
| VERSIFY ™ 3401 | Propylene-ethylene copolymer | | | 8 | 0.859 | 15 |
| VERSIFY ™ 3000 | Propylene-ethylene copolymer | | | 8 | 0.888 | 5 |

TABLE 2

Multilayer Film Structures

| Sample | Film Thickness (μm) | Layer Distribution A/B/C | Layer A Composition | Layer B Composition | Layer C Composition | Gloss 45° (units) |
|---|---|---|---|---|---|---|
| Comparative Film 1 | 40 | 25/50/25 | 70% ELITE ™ NG 5401B + 30% LDPE 611A | 60% DOWLEX ™ TG 2085B + 30% LDPE 611A + 10% WHITE MB | 80% ELITE ™ NG 5401B + 20% LDPE 611A | 46.9 |
| Comparative Film 2 | 40 | 25/50/25 | 70% MDPE 6995 + 30% DOWLEX ™ NG 2045B | 60% DOWLEX ™ TG 2085B + 30% LDPE 611A + 10% WHITE MB | 80% ELITE ™ NG 5401B + 20% LDPE 611A | 10.12 |
| Inventive Film 1 | 40 | 25/50/25 | 50% MDPE 6995 + 50% VERSIFY ™ 3200 | 60% DOWLEX ™ TG 2085B + 30% LDPE 611A + 10% WHITE MB | 80% ELITE ™ NG 5401B + 20% LDPE 611A | 5.64 |
| Inventive Film 2 | 40 | 30/40/30 | 50% MDPE 6995 + 50% VERSIFY ™ 3200 | 60% DOWLEX ™ TG 2085B + 30% LDPE 611A + 10% WHITE MB | 80% ELITE ™ NG 5401B + 20% LDPE 611A | 5.64 |

Gloss 450 was measured for the multilayer film structures of Table 2 and the results are presented in Table 2 above. As shown, both Inventive Films 1 and 2, which included a matte layer (Layer A) comprising ethylene-based polymer and propylene-ethylene copolymer (VERSIFY™ 3200), had gloss 45° values less than 10 units, specifically at 5.64. In contrast, both Comparative Films 1 and 2, which are films comprising only ethylene-based polymers, had gloss values above 10 units.

Referring to FIG. 1, the Inventive Films 1 and 2 exhibited a hot tack strength of greater than 2.5 N/25.4 mm at 75° C., whereas both Comparative Films 1 and 2 had a hot tack strength of zero at 75° C. This further demonstrates that Inventive Films 1 and 2 had low hot tack initiation temperature (HTIT), specifically an HTIT below 70° C., whereas both Comparative Films 1 and 2 had an HTIT value of at least 75° C. Comparative Film 2, which included significantly better matte performance than Comparative Film 2 yet inferior matte performance relative to Inventive Films 1 and 2, had an HTIT value greater than 105° C.

Figure 2:
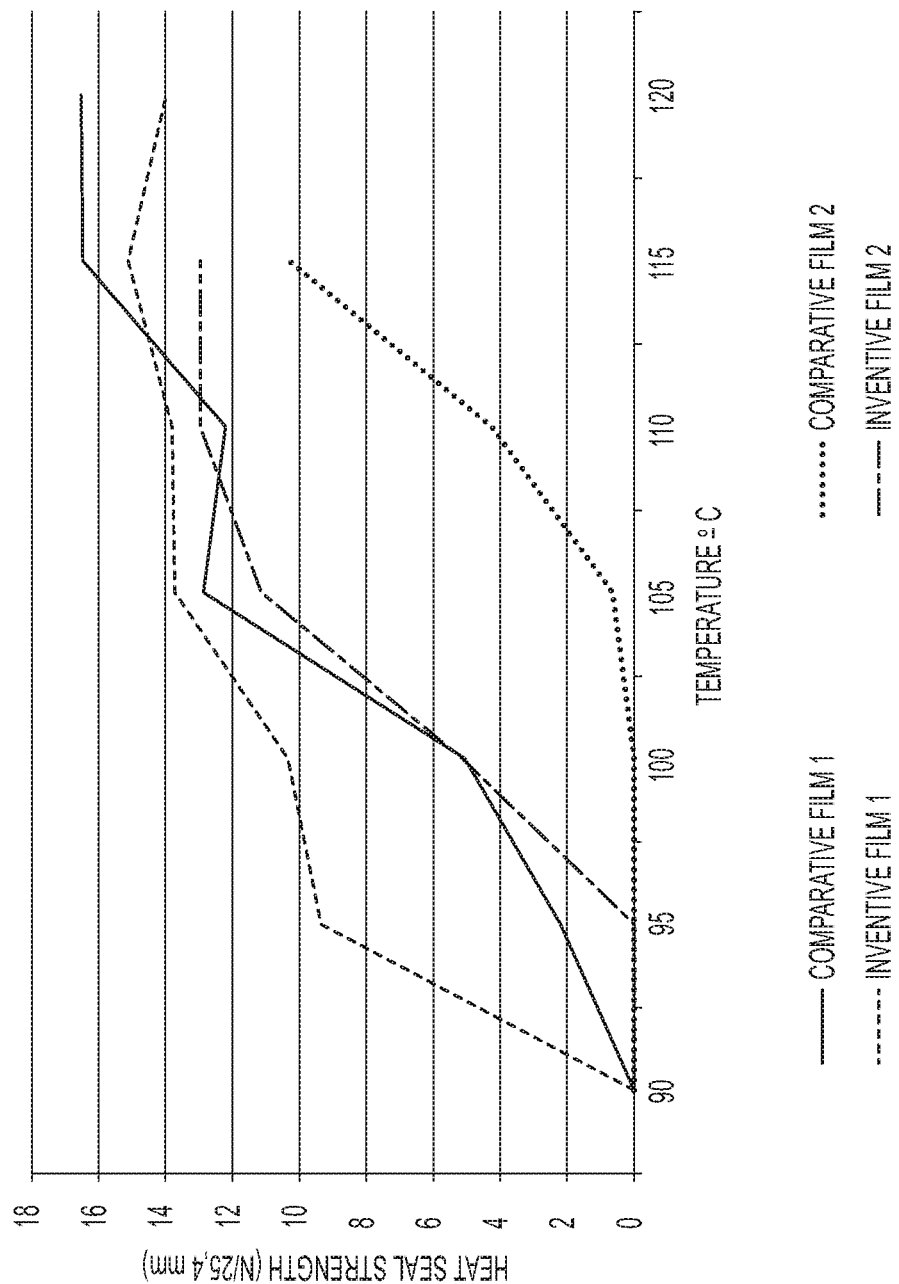
FIG. 2 is a graphical depiction of heat seal strength vs temperature for comparative and inventive films according to one or more embodiments of the present disclosure.

Referring to FIG. 2, the Inventive Films 1 and 2 exhibited comparable heat seal strength to Comparative Film 1; however, Comparative Film 1 had extremely poor matte performance i.e., a gloss 45° value of 46.9 units. Comparative Film 2, which exhibited better matte performance than Comparative Film 2, did not achieve the heat seal performance of Inventive Films 1 and 2. For example, both Inventive Films 1 and 2 exhibited a heat seal strength of at least 4 N/25.4 mm at 100° C., whereas Comparative Film 2 had a heat seal strength of zero at 100° C. Summarizing, only the inventive films achieved the combination of matte performance and heat seal strength.

In addition to the multilayer film structures of Table 2, further multilayer ABC film structures were prepared and are listed in Table 4 below. As shown in Table 3 below, the matte layer A composition of the ABC structure of the Table 4 examples varied, but layers B and C were the same in all of the examples listed in Table 4. The procedure for making the films of Table 4 was the same procedure used to make the films of Table 2 above.

TABLE 3

Composition of Layers B and C

| Layer A Composition | Layer B Composition | Layer C Composition |
|---|---|---|
| Compositions listed in Table 4 | 60% DOWLEX ™ TG 2085B + 30% LDPE 203M + 10% WHITE MB | 80% ELITE ™ NG 5401B + 20% LDPE 203M |

TABLE 4

Additional Multilayer Film Structures

| Sample | Film Thickness (μm) | Layer Distribution A/B/C | Layer A Composition | Gloss 45° (units) | HTIT of 70° C. or below? | Heat Seal Strength >4N at 100° C.? |
|---|---|---|---|---|---|---|
| Comparative Film 3 | 40 | 25/50/25 | 70% ELITE ™ NG 5401B + 30% LDPE 203 M | 43.5 | No | No |

TABLE 4-continued

Additional Multilayer Film Structures

| Sample | Film Thickness (μm) | Layer Distribution A/B/C | Layer A Composition | Gloss 45° (units) | HTIT of 70° C. or below? | Heat Seal Strength >4N at 100° C.? |
|---|---|---|---|---|---|---|
| Comparative Film 4 | 40 | 25/50/25 | 70% MDPE 6995 + 30% DOWLEX ™ NG 2045B | 10.0 | No | No |
| Inventive Film 3 | 40 | 25/50/25 | 50% MDPE 6995 + 50% VERSIFY ™ 3200 | 5.5 | No | Yes, 8.9N |
| Inventive Film 4 | 40 | 25/50/25 | 80% MDPE NG 6995 + 20% VERSIFY 3200 | 6.8 | Yes | No |
| Inventive Film 5 | 40 | 25/50/25 | 60% MDPE NG 6995 + 40% VERSIFY 3200 | 5.6 | Yes | Yes, 6.7N |
| Inventive Film 6 | 40 | 25/50/25 | 40% MDPE NG 6995 + 60% VERSIFY 3200 | 6.0 | Yes | Yes, 7.9N |
| Inventive Film 7 | 40 | 25/50/25 | 50% MDPE NG 6995 + 50% VERSIFY 2300 | 5.7 | Yes | Yes, 8.4N |
| Inventive Film 8 | 40 | 25/50/25 | 50% VERSIFY 3200 + 50% HDPE NG7000 | 5.3 | Yes | Yes, 9.3N |
| Inventive Film 9 | 40 | 25/50/25 | 40% MDPE NG 6995B + 60% VERSIFY 3401 | 6.4 | Yes | Yes, 8.0N |
| Inventive Film 10 | 40 | 25/50/25 | 20% MDPE NG 6995B + 80% VERSIFY 3401 | 7.1 | Yes | Yes, 6.4N |
| Inventive Film 11 | 40 | 25/50/25 | 40% MDPE NG 6995B + 60% VERSIFY 3000 | 5.4 | No | Yes, 7.7N |

As shown in Table 4, Comparative Films 3 and 4, which did not include propylene-ethylene copolymer, yielded poor Gloss 45 values of 10 units or above. Additionally, the Comparative Examples 3 and 4 also did not have a suitable hot tack initiation temperature (HTIT), specifically an HTIT below 70° C. or a heat seal strength of at least 4 N/25.4 mm at 100° C. above. As shown, Inventive Films 3-11, which included a matte layer (Layer A) comprising ethylene-based polymer and propylene-ethylene copolymer, all had gloss 450 values less than 10 units.

In addition to gloss 450 values less than 10 units, inventive films 5-10 all have an HTIT below 70° C. and a heat seal strength of at least 4 N/25.4 mm at 100° C. For these films, this combination of gloss 45°, HTIT below 70° C., and heat seal strength was achieved across various weight percentages for ethylene-based polymer and propylene-ethylene copolymer. Moreover, Inventive Film 7 included VERSIFY™ 2300 (melt index ($I_2$) of 2 g/10 mins), and yielded a suitable combination of gloss 45°, HTIT, and heat seal strength similar to films with VERSIFY™ 3200 and VERSIFY™ 2300, which each had melt index values of ($I_2$) of 8 g/10 mins. Also, as shown in Inventive Film 8, an HDPE ethylene-based polymer was be suitable similar to several of the other films having MDPE.

Some of the inventive films did not achieve both the HTIT below 70° C. and a heat seal strength of at least 4 N/25.4 mm at 100° C. As further shown in Table 3, Inventive Films 3 and 11 achieved the desired gloss values and a heat seal strength of at least 4 N/25.4 mm at 100° C.; however, Inventive Films 3 and 11 did not achieve an HTIT below 70° C. Conversely, Inventive Film 4 achieved the desired gloss values and a these films did not achieve an HTIT below 70° C. but did not achieve a heat seal strength of at least 4 N/25.4 mm at 100° C.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A multilayer film comprising at least one matte layer and at least two additional layers, wherein the matte layer comprises:
    20 to 80 weight % propylene-ethylene copolymer having a density from 0.857 to 0.895 g/cc and a melt flow rate ($I_2$) of 2 to 25 g/10 min when measured according to ASTM D-1238 at 230° C. and 2.16 kg; and
    20 to 80 weight % ethylene based polymer having a density from 0.935 to 0.955 and a melt flow rate ($I_5$) of 0.1 to 1.0 g/10 min when measured according to ASTM D-1238 at 190° C. and 5.0 kg, and the at least two additional layers independently comprise at least one of polyamide, propylene-based polymer, ethylene-based polymer, ethylene vinyl acetate (EVA), ethylene vinyl alcohol (EVOH), ethylene acrylic acid, and ethylene maleic anhydride, wherein the multilayer film has a gloss 45% value of less than 10 units when measured according to ASTM D-2457, and a hot tack initiation temperature of 70° C. or below wherein at least one of the two additional layers comprises linear low density polyethylene (LLDPE) having a density of 0.905 to 0.930 g/cc and a melt flow rate ($I_2$) of 0.5 to 3.0 g/10 min when measured according to ASTM D-1238 at 190° C. and 2.16 kg.

2. The multilayer film of claim 1, wherein the melt flow rate ($I_2$) of the propylene-ethylene copolymer is from 3 to 10 g/10 min when measured according to ASTM D-1238 at 230° C. and 2.16 kg.

3. The multilayer film of claim 1, wherein at least one of the two additional layers comprises low density polyethylene (LDPE) having a density of 0.910 to 0.935, a melt flow rate ($I_2$) of 0.5 to 3.0 g/10 min when measured according to ASTM D-1238 at 190° C. and 2.16 kg, and a molecular weight distribution (MWD=Mw/Mn) of 3 to 10 determined via gel permeation chromatography (GPC), where Mw is a weight averaged molecular weight, and Mn is a number averaged molecular weight.

4. The multilayer film of claim 1, wherein at least one of the two additional layers comprises linear low density polyethylene having a density of 0.905 to 0.930 g/cc and a melt flow rate ($I_2$) of 0.5 to 3.0 g/10 min when measured according to ASTM D-1238 at 190° C. and 2.16 kg, and low density polyethylene having a density of 0.910 to 0.935, a melt flow rate ($I_2$) of 0.5 to 3.0 g/10 min when measured according to ASTM D-1238 at 190° C. and 2.16 kg, and a molecular weight distribution (MWD=Mw/Mn) of 3 to 10 determined via gel permeation chromatography (GPC), where Mw is a weight averaged molecular weight, and Mn is a number averaged molecular weight.

5. The multilayer film of claim 1, wherein the matte layer comprises 40 to 60 weight % propylene-ethylene copolymer, and 40 to 60 weight % ethylene-based polymer.

6. The multilayer film of claim 1, wherein the multilayer film has a thickness of 20 to 200 μm.

7. The multilayer film of claim 1, wherein the gloss 45% value is less than 8 units when measured according to ASTM D-2457.

8. The multilayer film of claim 1, wherein the multilayer film has a hot tack strength of greater than 2.5 N/25.4 mm at a temperature range of 75° to 90° C., when measured according to ASTM F-1921.

9. The multilayer film of claim 1, wherein the multilayer film has a heat seal strength of at least 4 N/25.4 mm at 100° C.

10. An article comprising the multilayer film of claim 1.

11. The article of claim 10, wherein the article is a flexible package.

12. A multilayer film comprising at least one matte layer and at least two additional layers, wherein the matte layer comprises:

20 to 80 weight % propylene-ethylene copolymer having a density from 0.857 to 0.895 g/cc and a melt flow rate ($I_2$) of 2 to 25 g/10 min when measured according to ASTM D-1238 at 230° C. and 2.16 kg; and 20 to 80 weight % ethylene based polymer having a density from 0.935 to 0.955 and a melt flow rate ($I_5$) of 0.1 to 1.0 g/10 min when measured according to ASTM D-1238 at 190° C. and 5.0 kg, and the at least two additional layers independently comprise at least one of polyamide, propylene-based polymer, ethylene-based polymer, ethylene vinyl acetate (EVA), ethylene vinyl alcohol (EVOH), ethylene acrylic acid, and ethylene maleic anhydride, wherein the multilayer film has a gloss 45% value of less than 10 units when measured according to ASTM D-2457, and a heat seal strength of at least 4 N/25.4 mm at 100° C. wherein at least one of the two additional layers comprises linear low density polyethylene (LLDPE) having a density of 0.905 to 0.930 g/cc and a melt flow rate ($I_2$) of 0.5 to 3.0 g/10 min when measured according to ASTM D-1238 at 190° C. and 2.16 kg.

13. The multilayer film of claim 12, wherein the matte layer comprises 40 to 60 weight % propylene-ethylene copolymer, and 40 to 60 weight % ethylene-based polymer.

14. The multilayer film of claim 12, wherein the melt flow rate ($I_2$) of the propylene-ethylene copolymer is from 3 to 10 g/10 min when measured according to ASTM D-1238 at 230° C. and 2.16 kg.

\* \* \* \* \*